Figure 4:
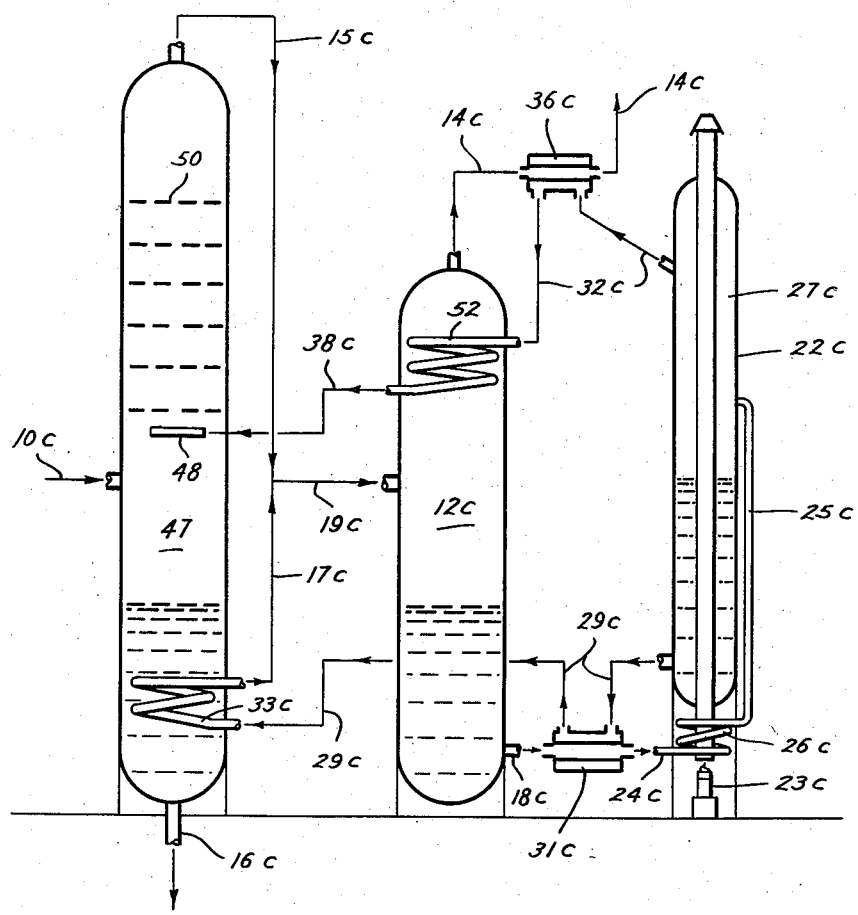

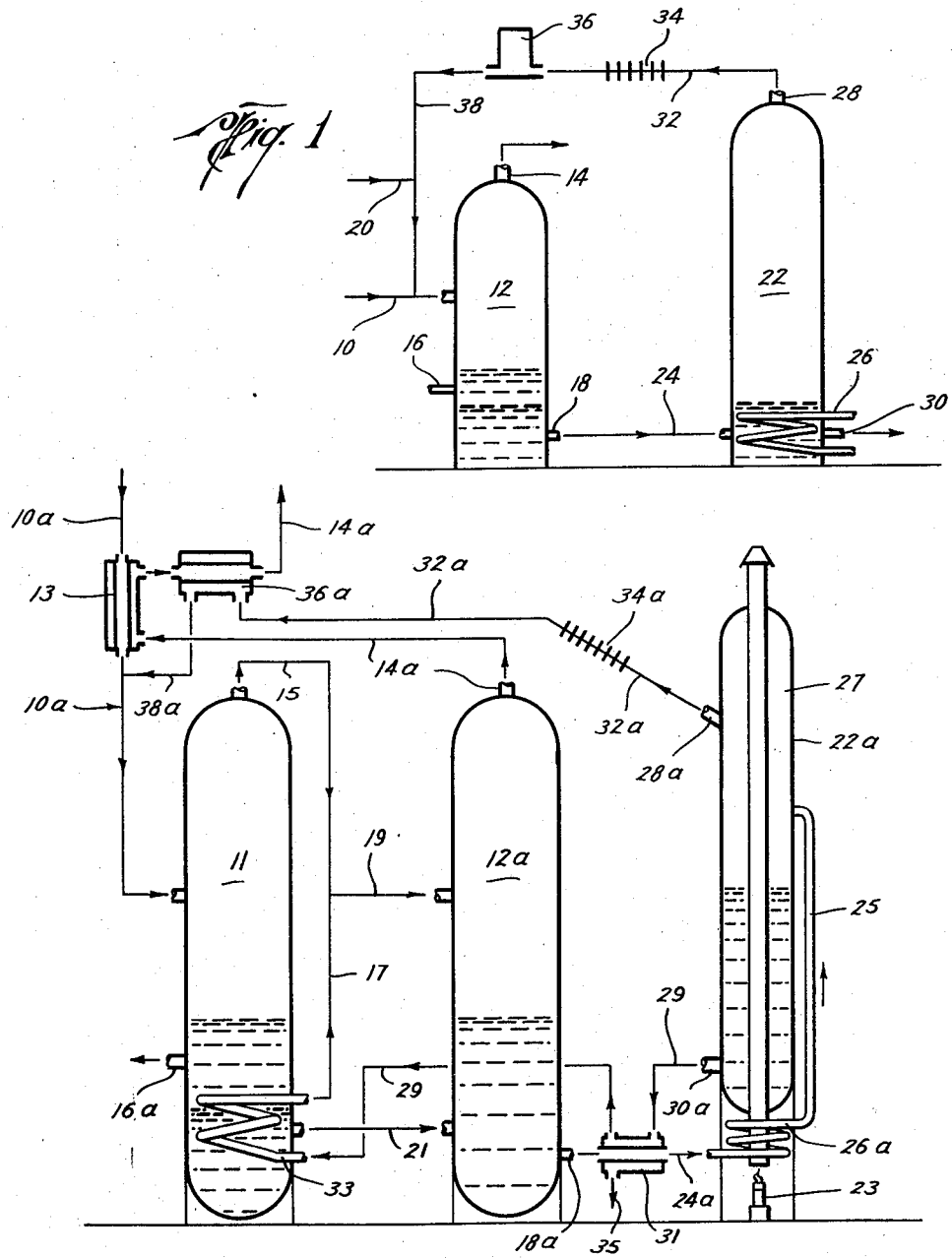

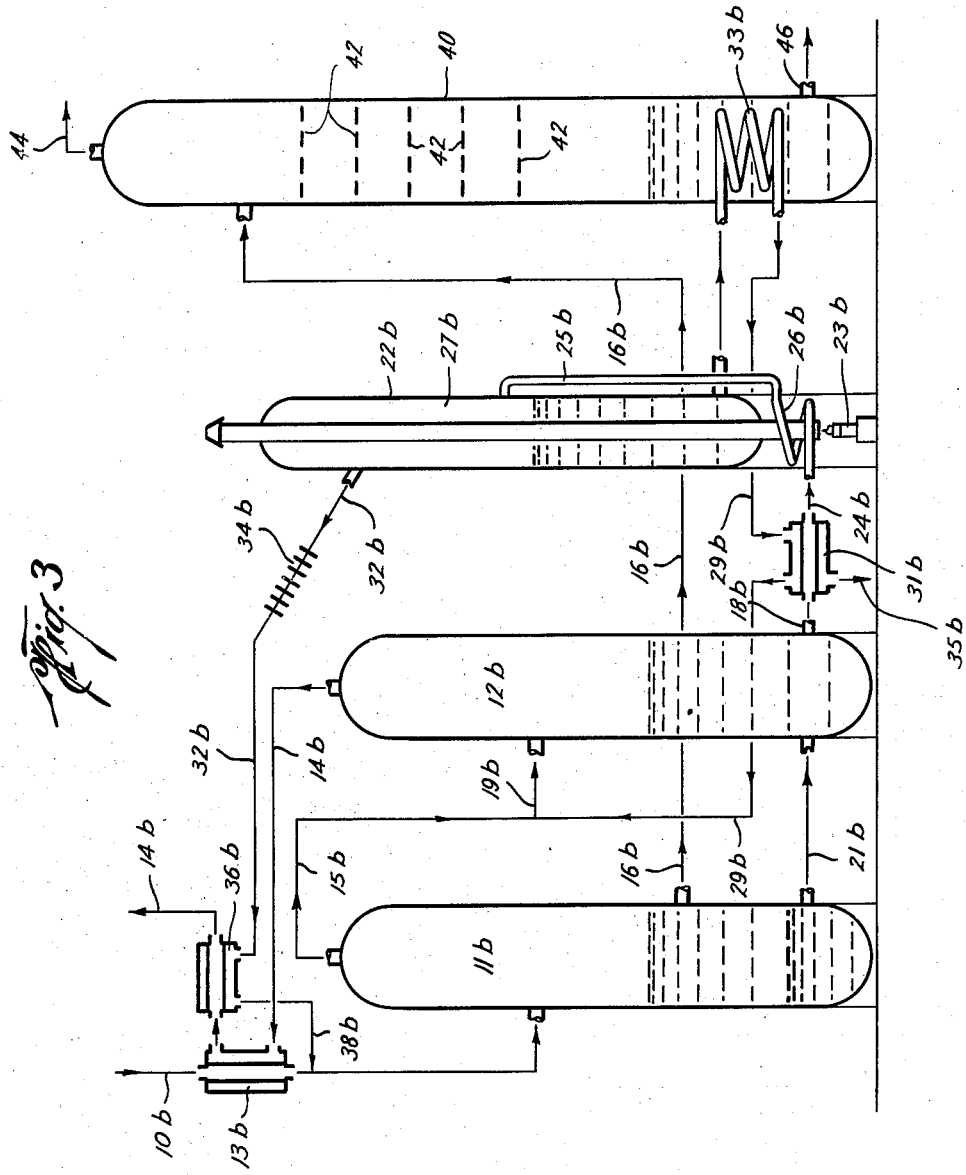

Joel A. Newsome, Jr.
INVENTOR.

United States Patent Office 2,894,372
Patented July 14, 1959

2,894,372

METHOD OF AND MEANS FOR REMOVING CONDENSABLE VAPORS CONTAINED IN MIXTURES

Joel A. Newsome, Jr., Houston, Tex.

Application October 16, 1953, Serial No. 386,608

8 Claims. (Cl. 62—17)

The present invention relates to methods of and means for removing and recovering condensable vapors contained in mixtures, and more particularly to the recovery of condensable hydrocarbon vapors and removable of water vapors and impurities from hydrocarbon vapors such as from vapors produced as natural gas from the earth.

The present invention is particularly suited for the recovery of condensable vapors produced as a part of the total fluid from natural occurring deposits and, for the purpose of disclosure, examples of the invention are described in this connection. It will be understood, however, that the invention may be adapted to other uses which will readily be apparent to those skilled in the art.

In the production of liquid fuels from natural occurring deposits, such as oil, gas and like wells, a large amount of vapors are produced as a part of the total fluids. These vapors are at present valued as vapor fuel, but include many or all of the fractions of all hydrocarbons present in the natural deposit. A substantial portion of these vapors can be liquefied by a reduction of temperature of the system, removed, and used as liquid fuel without the reduction of the commercial value of the vapor.

It is therefore a major object of the present invention to provide a method of and means for liquefaction of vapors contained in mixtures so that the liquefied vapors may be separated and removed from the system.

It is a more particular and further object of the present invention to provide a method of and means for liquefaction of hydrocarbon vapors from mixtures of hydrocarbon vapors so that the liquefied hydrocarbon vapors may be separated and recovered from the system.

It is yet a further object of the present invention to provide a method of and means for the liquefaction of hydrocarbon vapors from mixtures of such vapors by introducing a refrigerant in liquid phase directly into the mixture of hydrocarbon vapors thereby effecting vaporization of the refrigerant and liquefaction of the condensable hydrocarbon vapors so that the liquefied hydrocarbon vapors may be recovered and removed and the refrigerant recovered for reintroduction in liquid phase into the system.

It is yet a further object of the present invention to provide a continuous method of and means for the liquefaction of condensable hydrocarbon vapors from a flowing stream of hydrocarbon vapors in which the liquefied hydrocarbon vapors are separated and recovered and the refrigerant is separated and recovered and recycled and reintroduced into the system.

It is yet a further object of the present invention to provide a method of and means for the liquefaction of condensable hydrocarbon vapors from mixtures of hydrocarbon vapors in which such condensable hydrocarbon vapors are liquefied by a reduction in temperature but which prevents the formation of ice, such as by freezing water vapors, which are usually present in such a system and which also prevents the formation of other solids, such as gas hydrates which would block the passage of vapors through the system.

A further object of the present invention is the provision of such a method and system in which condensable hydrocarbon vapors are liquefied and removed and which includes the removal of condensable impurities from the vapor mixture.

Yet a further object of the present invention is the provision of a method of and means for lowering the temperature of mixtures of vapors as they pass into a separation vessel by means of the addition of a substance directly into the gas stream which either by chemical or physical reaction effects the desired depression in temperature and in which the heat content of the hydrocarbon vapors is removed at the point of separation and returned to the vapor mixture at a point in the system downstream from the separation vessel and, at the same time, adding the energy which has been added to the system to the gas stream at this point.

Other object advantages and features will readily be apparent as the description proceeds.

The present invention is based upon the discovery that the addition of a substance or mixtures of substances directly into the gas stream causes the desired depression in temperature, whether by chemical or physical reaction, to condense condensable vapors therein which may readily be separated from the gas stream. If desired, the substance introduced can be recovered from the gas stream after removal of the condensed vapors by usual or conventional absorption or separation methods. Also, if desired, the substance may be recycled and reused. The heat content can be returned to the gas stream at a point in the system down stream from the separation vessel, when using a continuous system, and, also, the energy which has been added to the system can be added to the gas stream at this point. Various and typical examples of this kind will be described later.

While the invention may be applied to other systems and other uses, for the purpose of disclosure, the invention will be described as it may be applied to flow lines or pipes through which hydrocarbon vapors pass from their source to a distribution system. As mentioned before, however, the invention may be used with any suitable system and in many places in the system, and may also be applied to either continuous, multistage, or batch processes and the like.

It is known to those skilled in the art that the volumetric relation of hydrocarbon liquid and vapor phases is a function of the temperature and total pressure of the system. This fact is commonly used in the trade in the recovery of hydrocarbon liquids from a vapor stream, the desired temperature for liquid recovery being obtained by the cooling effect produced with expansion of the gas or by the application of external refrigeration. While these methods are somewhat effective in the removal of liquid hydrocarbons from the vapor system they are limited to application upon systems which are under high pressures and in which systems it is desirable to add a chemical substance to prevent the formation of solid particles, such as ice or gas hydrates.

The present invention does not depend upon the reduction of pressure of the hydrocarbon vapors such as by expansion valves and the like as a means of reducing the temperature of the system, nor does it depend upon the presence of additional substances to prevent the formation of solid particles. It should be understood, however, that the reduction of pressure at any stage in the proposed method does not affect the application of the present method and means but may be used to increase its effectiveness, and that if desired, additional substances may be added to aid in preventing formation of solids.

In the production of hydrocarbons from natural formations, such as oil and gas wells, it is common practice to flow the produced fluids through a conductor pipe set in the earth to separation equipment on the surface, remove the liquid hydrocarbons from the stream and flow the hydrocarbon vapors, which may include water and other vapors, such as impurities, through pipes to a distribution system. Ordinarily, unless a method of and means for the removal of water vapor and/or impurities by chemical methods are provided, the hydrocarbon vapor system will be saturated with water vapor and/or include impurities at the temperature and under the pressure conditions of the distribution system. In common practice, the systems are maintained at the temperature of the surrounding atmosphere and/or the earth through which they pass or, under certain conditions, at a temperature in excess of the surrounding media in order to prevent the formation of solid particles, such as gas hydrates or ice in the system.

As mentioned before, the present invention obtains a temperature reduction of the hydrocarbon vapors by addition to the hydrocarbon stream of a chemical substance or mixtures in liquid phase, which chemical substance or mixtures will vaporize, at least in part, due to its vapor pressure, thus causing the reduction in temperature of the entire stream. This chemical substance may be termed a refrigerant and, preferably, should have the following properties: (1) It should be in a liquid phase when under a temperature and pressure equal to the system into which it is introduced. (2) It must vaporize, at least in part, when introduced into the system due to its partial vapor pressure with respect to the vapors in the system. (3) It should have a latent heat of vaporization in order to reduce the temperature of the total stream at the introduction point. (4) For the separation of condensed vapors the refrigerant should be insoluble when in liquid phase in at least some of the condensate formed when the temperature of the system is reduced or the liquid refrigerant should be capable of being separated from at least a portion of the condensate by the use of a selective solvent.

Thus, the substance herein termed "refrigerant" should be taken to mean any substance or mixture of substances which, when introduced into the hydrocarbon system will result in the reduction of the temperature of the system by a change of the refrigerant from the liquid state to a vapor state due to the volatile nature of the refrigerant and the lack of partial vapor pressure of the refrigerant in the hydrocarbon vapors to which the refrigerant is mixed. As the refrigerant has a latent heat of vaporization the change of state results in the absorption of heat by the refrigerant from the hydrocarbon vapors causing them to cool and condense. This change of state and not the difference in temperatures of the liquid refrigerant and hydrocarbon stream into which the refrigerant is mixed causes the cooling and formation of condensates. The choice of refrigerants to be used will depend upon the physical properties of the system which is to be processed by this method. For example, ammonia, the alcohols, methyl chloride, carbon dioxide and sulfur dioxide are examples of the substances which may be used. Under certain conditions water may be the refrigerant chosen. Also, a substance of the system may be used, for example, in hydrocarbon systems, propane or butane, as well as others, may be used.

It is therefore readily apparent that there are a great number of chemical substances which are satisfactory.

The substance chosen to recover the refrigerant will also depend upon the physical properties of the hydrocarbon system to be processed as well as the properties of the refrigerant. This substance may be either liquid or solid and the recovery process may be continuous or intermittent, such as two or more units which are alternately used and regenerated. To mention a few satisfactory materials for recovering the refrigerant, the following are given, calcium chloride, barium chloride, strontium chloride, methyl or ethyl amines, silia gel, activated charcoal or alumina, absorption oils and others having absorption properties or being capable of absorbing the rerfrigerant.

In describing the apparatus of the invention and the method involved in using this particular apparatus, ammonia will be described as the refrigerant although it is understood that the invention is not limited to any particular refrigerant.

In the accompanying drawings like character references designate like parts throughout the several views, and Figure 1 is a flow diagram illustrating apparatus constructed according to the invention in which the refrigerant is introduced directly into the vapor mixture and includes means for separating condensed vapors from those not condensed and for recovering the refrigerant and recycling it in the system, Figures 2 and 3 are flow diagrams illustrating modified apparatus of the invention by which a reduced amount of energy is added to the system in order to condense and separate the condensable vapors from the mixture of vapors and recover and recycle the refrigerant for use, and Figure 4 is a flow diagram of apparatus of the invention illustrating the invention as applied to hydrocarbon liquids, under pressure, when passed into atmospheric storage.

Referring now to the drawings, and particularly to Figure 1 the reference 10 designates a flow line or pipe which conducts a gas stream including a mixture of vapors from its source to a distribution system, not shown. The source may be the well proper or from separation equipment used to separate liquids from gas or any source. In the case of oil and gas wells, the flow stream in the pipe usually consists of gaseous and hydrocarbon components and water in vapor phase, as well as impurities in vapor phase, such as carbon dioxide, and the like.

The flow line 10 is connected to a separator 12, which may be of any conventional or desirable type. A flow line 14 may be connected to the upper end of the separator 12 for the outflow of vapors not condensed for distribution to desired destinations and for desired uses, and a pair of outlets 16 and 18 which are vertically spaced with respect to one another are provided adjacent the lower portion of the separator 12 for the outflow, respectively, of condensed hydrocarbon vapors and the water-ammonia solution formed by the introduction of ammonia into the system.

Ammonia may be introduced directly into the system by means of line 20, which introduces the ammonia into the hydrocarbon vapors flowing in line 10 before entry into the separator 12, although the refrigerant may be introduced at other points in the system, such as in the separator 12.

While it is within the scope of the invention to merely discard the ammonia from the outlet 14 and/or the ammonia-water solution from the drain 18, a conventional or suitable refrigerant-recovery tower or vessel 22 may be provided for the recovery of ammonia from the ammonia-water solution and may be connected by the line 24 to the outlet 18 of the separator 12. The tower 22 may be of any desirable or suitable type, and no detailed description thereof is deemed necessary, however, a heating means of some type is used, such as the heating coil 26 through which suitable heated fluid is circulated from a source, not shown. At the upper end of the tower 22 is the outlet 28 for removing ammonia vapors and at the lower portion of the tower 22 is the outlet 30 for discharging the water removed from the gas stream to waste or to whatever purpose might be desired.

The coil 26 heats the ammonia-water mixture and returns the ammonia to a vapor state where it is taken out the upper outlet 28 in the line 32 connected thereto, and which includes a heat exchanger 34 to cool the ammonia vapors to liquid phase condition where they pass to the trap 36 for reintroduction into the system in the line 38.

In operating the apparatus of Figure 1 hydrocarbon vapors from a suitable source flowing in line 10 are introduced into the separator 12. Ammonia, in liquid phase, from lines 20 and 38 is introduced into the hydrocarbon vapors flowing in flow line 10. The absence of ammonia or a similar refrigerant in the incoming gaseous stream causes the liquid ammonia to vaporize resulting in the reduction of temperature of the gaseous stream. By simple regulation and pilot tests on the particular gas stream sufficient ammonia will be introduced into the stream to reduce the temperature of the system at this point to a desired level, such as, for example 0° F. This reduction of temperature of the gas stream causes liquefaction or condensation of at least a portion of the hydrocarbon vapors and water vapors, as well as vapors or impurities in the hydrocarbon stream all of which pass into the separator 12.

In the separator 12 the noncondensed vapors pass upwardly and out the outlet 14 for subsequent distribution and the hydrocarbon liquids and ammonia-water mixtures separate by gravity in the bottom of the separator 12 due to their different densities. The hydrocarbon liquids may be removed from the lower portion of the separator 12 by means of the line 16 for distribution and the water-ammonia solution may be removed by means of the drain line 18 to waste or by means of the line 24 to the refrigerant-recovery tower 22.

When the tower 22 is used and the water-ammonia mixture is passed thereto, this mixture is heated by means of the coil 26 which returns the ammonia to vapor state thereby causing a separation of the ammonia vapors, which are removed from the tower 22 by means of the outlet 28, and the water or weak water-ammonia solution collects in the bottom of the tower 22 and is removed by the drain 30 to waste or such other distribution as may be desirable. By simple regulation the required amount of heat may be supplied to the tower 22 to vaporize substantially only the ammonia and to prevent vaporization of the remaining materials, and no specific details thereof are deemed necessary.

The ammonia vapors removed from the tower 22 from the outlet 28 flow in the line 32 and pass through the heat exchanger 34 where they are cooled to liquid stage from which they are passed to the trap 36 for return to the system in line 38.

As mentioned, no detailed description is given or deemed necessary of the separator, refrigerant-recovery tower, heating element, heat exchanger and traps, as such, inasmuch as any conventional or suitable elements of this character or equivalents may be used. Also, the operating conditions, temperatures, amounts of refrigerant and the like will vary considerable depending upon the type of feed, type and concentrations of refrigerants or mixtures thereof, refrigerant-recovery materials and arrangements, temperature of the feed and other variables, all of which may be determined readily and easily by simple pilot tests.

Modified apparatus constructed according to the invention in which a method of the invention may be carried out is illustrated in Figure 2. Referring to this figure, the hydrocarbon gaseous feed enters the flow line 10a and ammonia in liquid phase is introduced into this line from line 38a before passing into the separator 11. A heat exchanger 13 is provided in the line 10a in order to reduce the temperature of the vapors flowing in that line before introduction of the liquid ammonia into the stream.

In this arrangement a pair of separators 11 and 12a are utilized and the vapors in separator 11 which are not condensed are taken out the top in line 15 and mixed with a weak water-ammonia solution from line 17 and flowed in line 19 into the separator 12a. The purpose of introducing the weak ammonia-water solution into the vapors from the separator 11 is to remove excess ammonia vapors which may be present in the vapors leaving the top of separator 11 in line 15. The weak ammonia solution and vapors are passed in line 19 to the separator 12a where they are separated. The uncondensed vapors are removed from the separator 12a in the line 14a and are passed through the heat exchanger 13 for the purpose of lowering the temperature of the gas flowing into the system in line 10a and also pass through heat exchanger 36a for the purpose of cooling recovered ammonia vapors so that they may be converted into liquid state for reintroduction into the system in line 38a. This provides a more efficient utilization of energy.

The outlets 21 and 16a are provided adjacent the lower portion of separator 11 for removal of hydrocarbon liquids from the system and the strong water-ammonia solution, respectively, the latter being passed from the lower portion of separator 11 into separator 12a by means of fine 21 connected therebetween, where substantially all the remaining ammonia vapors in the feed gas are removed in the drain 18a and passed by means of the line 24a into the coil 26a of the refraction tower 22a. As illustrated, the refraction tower 22a is of the reboiler type and the water-ammonia mixture is heated in coil 26a by the flame 23, or other suitable means, the resulting thermosyphon effect lifting the liquid through the upstanding pipe 25 connected to the coil 26a and extending up to approximately the central portion of the refraction tower 22a and into the reboiler 27. If desired, however, the circulation of the absorbent and/or the refrigerant may be effected by mechanical means, such as a pump and the like. The refrigerant, ammonia, is vaporized in the reboiler 27 and passes out of the refraction tower 22a in outlet 28a and through line 32a through an atmospheric heat exchanger 34a and through heat exchanger 36a where it is cooled to liquid state for reintroduction into the system in line 38a. The weak water-ammonia solution collects in the lower portion of the refraction tower 22a and is removed by the drain 30a and passes in the line 29 through heat exchanger 31 where it is cooled (and heats the strong ammonia-water solution in line 24a) and passed into the coil 33 in separator 11 in which heats the hydrocarbons collected in the bottom of the separator 11 and cools the weak water-ammonia solution for introduction in line 17 to the vapors in line 15. The remainder of this weak water-ammonia solution may be drained to waste by the drain 35.

While it is thought that the operation of the apparatus of Figure 2 and the method illustrated thereby are apparent, by way of summary, hydrocarbon vapors, including water vapors and in some cases impurities, enter the system in the line 10a and pass through heat exchanger 13 where the vapors are lowered in temperature. Refrigerant, such as ammonia, in liquid state is introduced into the mixture of hydrocarbon vapors which causes a vaporization of the refrigerant resulting in cooling or lowering the temperature of the vapors and thereby condensing at least a portion of the condensable vapors therein, as explained in connection with Figure 1. In separator 11 the liquid hydrocarbons are heated slightly and removed from the system by means of line 16a and the hydrocarbon and ammonia vapors not condensed are removed by means of line 15 and passed to separator 12a. A week ammonia-water solution from refraction tower 22a is utilized in coil 33 to heat the hydrocarbons slightly and thereby stabilize the condensed hydrocarbons and is then introduced into the stream of hydrocarbon vapors in line 15 to absorb excess ammonia vapors therein. This resulting mixture is introduced into separator 12a along with the strong ammonia-water solution from the drain 21 of separator 11 and noncondensed vapors are passed out of separator 12a in line 14a and through the heat exchangers 13 and 36a to effect cooling of the incoming stream of gas in line 10a and to aid in cooling and thereby condensing ammonia vapors in line 32a. The vapors are then passed to suitable distribution destinations.

The strong ammonia-water solution is removed from the lower portion of separator 12a by means of the drain 18a and is heated by heat exchanger 31 in line 24a and passed to the coil 26a in the fractionation tower 22a. Heating of the strong ammonia-water solution causes the solution to rise by thermosyphon action in pipe 25 into the reboiler 27 where the ammonia is vaporized and removed therefrom by outlet 28 and passed through line 32a and heat exchangers 34a and 36a for condensing the ammonia vapor into liquid ammonia for reintroduction in line 38a into the incoming vapors in line 10a.

The weak ammonia-water solution collects in the bottom of refraction tower 22a and is removed by the drain 30a and line 29, which passes in heat exchange relation with heat exchanger 31, which aids in heating the strong ammonia-water solution flowing from separator 12a in line 24a. A portion of the weak ammonia-water solution may be drained to waste in drain line 35 and the remainder passed in line 29 to coil 33 to heat and thereby stabilize the liquid hydrocarbons in the lower portion of separator 11 and for reintroduction into the hydrocarbon vapors by means of line 17 to absorb ammonia vapors in the hydrocarbon vapors in line 15, as mentioned before.

As in the case of Figure 1, the various separators, refraction towers, heat exchangers and other elements and arrangements will vary with the feed stock, the type of fluid desired to be produced, temperature and pressure conditions, type and concentrations of refrigerant and the like, all of which may be determined by simple pilot tests, and which are deemed unnecessary to state in detail.

Figure 3 illustrates an arrangement quite similar to that of Figure 2 in which a fractionation tower has been added and the heating coil 33 has been moved from the separator 11 to the fractionating tower. Referring to Figure 3 it is thought unnecessary to describe the various elements similar to those of Figure 2, but it is noted that the corresponding parts are indicated by the same numerals as those in Figure 2 with the letter "b" added or substituted for the letter "a," as the case may be. Any suitable stabilizing or reflux tower 40 having the usual and conventional trays 42 therein may be utilized and which has a heating element of some type at the lower portion thereof, which may be the heat coil 33b and/or other heating means. An outlet 44 is provided at the upper end of the reflux tower and an outlet 46 is provided at the lower portion for separate removal of various fractions of hydrocarbons. It is obvious, of course, that additional outlets may be provided at various trays depending upon the products desired to be produced and the particular feed to the system. The liquid entering the reflux tower 40 by means of line 16b falls to the bottom through the trays 42 where it is comingled with vapors rising from the liquids in the bottom of the tower. Excess low molecular weight hydrocarbons which return to a vapor state are withdrawn through the outlet line 44 and the liquid hydrocarbons collected in the bottom of the reflux tower 40 are withdrawn in line 46 for distribution as desired. The weak ammonia-water solution in coil 33b is cooled and is passed through heat exchanger 31b and directly into line 15b, without passing through separator 11b, as is the case in Figure 2, where it comingles with the hydrocarbon vapors in line 15b in line 19b and is passed to the separator 12b as is the case in the apparatus and method illustrated by Figure 2.

Other than the mentioned differences in connection with Figure 3, the apparatus, mode of operation thereof and method of the invention are the same as that described in connection with Figure 2 and no further description or discussion is deemed necessary.

Referring to Figure 4, suitable apparatus and a method of applying the principles of the invention are illustrated when liquids, under pressure, such as hydrocarbon liquids are to be passed into atmospheric storage or storage at lower pressures. Referring now to this figure, a reflux tower 47, of any suitable construction, receives the liquid hydrocarbons from line 10c substantially at its mid-portion. The liquid hydrocarbons are trapped in this reflux tower which may be maintained at an intermediate pressure between the pressure of the liquid hydrocarbon source and the storage pressure. Vapors occur due to the pressure drop and temperature increase caused by heating coil 33c and rise in the reflux tower 47. A suitable tray 48 or injection means is provided so that liquid ammonia may be introduced into the system at this or some other point. The introduction of the refrigerant causes condensation of the heavier hydrocarbon vapors in reflux tower 47 which condensate then falls from the trays or baffles 50 positioned in the upper portion of the reflux tower 47 or other points of condensation. The liquid hydrocarbons are collected in the lower portion of the reflux tower 47 and are stabilized by means of heating by the coil 33c, as mentioned in connection with the description of Figure 3. The stabilized liquids may be removed from the system by means of the drain 16c.

The hydrocarbon and ammonia vapors may be removed from the upper portion of the reflex tower 47 in line 15c and may be contacted with a weak ammonia-water solution from line 17c and passed into separator 12c, as in the case in the apparatus and method of Figure 2. The remaining apparatus and mode of operation is the same as that of Figure 2 except that a heat exchanger 52 may be provided in the separation tower 12c in addition to or in place of heat exchanger 36c to further cool and condense the ammonia vapors into liquid ammonia for reintroduction into the system in injection means, plate or tray 48 in the reflux tower 47. The remaining parts are similar to those of Figure 2 and are designated by the same numerals as those in Figure 2 except that they are further identified by the letter "c" rather than the letter "a". The mode of operation, other elements and method of the invention are the same as that indicated in connection with Figure 2 and no further detailed description thereof is deemed necessary.

The above description of the method and apparatus of the invention, for the purpose of disclosure, are merely typical arrangements and examples of uses and it is understood that the particular arrangement of parts, concentrations of refrigerants, type of refrigerants, pressures and temperatures of the system and the desired products are all variable and the arrangement and operating conditions will vary considerably in view of these and other variables. For example, it should be noted, if desired, that a substance other than the weak water-refrigerant may be used to absorb refrigerant vapors, if desired. It should be noted further that while a gaseous mixture is referred to, this may contain some liquids, as many times gaseous mixtures contain fractions in liquid phase. Also, suitable gages, pumps, valves, controls and the like may be used, if desired, depending upon the conditions of the system or systems to which the invention is applied.

The present invention is particularly advantageous in that it provides an economical and reliable method of and apparatus for recovering heretofore unrecovered condensable vapors which are lost in conventional separation procedures, particularly in the production and storage of oil, gas and the like. As mentioned before, much gas and vapors are vented to the atmosphere and the vapors or gas which is used for fuel purposes is not effected by the recovery of these additional hydrocarbons.

It is therefore apparent that the apparatus and method of the present invention is well suited to carry out the foregoing objects and attains the advantages mentioned as well as others inherent therein.

Many changes in details, arrangement of parts, operating conditions and the like will readily suggest themselves to those skilled in the art which are encompassed within the spirit of the invention and the scope of the appended claims.

What is claimed is:

1. Apparatus for recovering condensable vapors contained in a gaseous mixture comprising, a first separator, a flow line connected to the first separator for introducing the mixture therein, an injector for introducing liquid-refrigerant into the mixture, outlets at the upper, intermediate and lower portions of the first separator for separate removal of uncondensed vapors, condensed vapors, and liquid-refrigerant residue, respectively, a second separator, a flow line connecting the lower outlet of the first separator to the second separator for flowing the liquid-refrigerant residue into the second separator, heating means in the second separator for heating the liquid-refrigerant residue to vaporize the refrigerant, outlets at the upper and lower portions of the second separator for separate removal of vaporized refrigerant and liquid residue, a flow line connected from the upper outlet of the second separator to the injector, and a condenser arranged in condensing relationship with said last-mentioned flow line for condensing the vaporized refrigerant before flowing to the injector.

2. A method of recovering condensable vapors including hydrocarbons contained in a gaseous mixture comprising the steps of introducing the mixture in a first separator, introducing ammonia in liquid phase directly into said mixture in quantity sufficient to lower the temperature of the mixture and to condense at least a portion of the vapors, removing uncondensed vapors from the upper portion of the separator, separating by gravity in the lower portion of the separator the condensed vapors and resulting liquid-ammonia residue, separately removing the separated condensed vapors and liquid-ammonia residue from the first separator, flowing the liquid-ammonia residue into a second separator, heating the residue in the second separator to vaporize substantially only the ammonia thereby separating the ammonia from its liquid residue, removing the vaporized ammonia from the second separator, condensing the removed vaporized ammonia, and recycling the condensed ammonia for such introduction in liquid phase into said mixture.

3. Apparatus for recovering condensable vapors contained in a gaseous mixture comprising, a first separator, a flow line connected to the first separator for introducing the mixture therein, an injector for introducing liquid refrigerant into the mixture, outlets at the upper, intermediate and lower portions of the first separator for separate removal of uncondensed vapors, condensed vapors and liquid-refrigerant residue, respectively, a second separator, a flow line connecting the lower outlet of the first separator to the second separator for flowing the liquid-refrigerant residue into the second separator, heating means arranged in heating relationship with the second separator for heating the liquid-refrigerant residue to vaporize the refrigerant, outlets at the upper and lower portions of the second separator for separate removal of vaporized refrigerant and liquid residue, a flow line connected from the upper outlet of the second separator to the injector, and a condenser arranged in condensing relationship with said last-mentioned flow line for condensing the vaporized refrigerant before flowing to the injector.

4. A method of recovering condensable vapors including hydrocarbons contained in a gaseous mixture comprising the steps of introducing ammonia in liquid phase directly into the mixture in quantities sufficient to lower the temperature of the mixture and to condense at least a portion of the vapors, removing uncondensed vapors from the mixture, separating condensed vapors and resulting liquid-ammonia residue, separately removing the separated condensed vapors and liquid ammonia residue, heating the liquid ammonia residue to vaporize substantially only the ammonia thereby separating the ammonia from its liquid residue, condensing the removed vaporized ammonia, and recycling the condensed ammonia for such introduction in liquid phase into the mixture as aforesaid.

5. A method of recovering condensable vapors contained in a gaseous mixture comprising the steps of introducing refrigerant in liquid phase directly into the mixtures in quantities sufficiently to lower the temperature of the mixture and to condense at least a portion of the vapors by evaporation of the refrigerant, the refrigerant having a partial vapor pressure with respect to the vapors and having a latent heat of vaporization, removing uncondensed vapors from the mixture, separating condensed vapors and resulting liquid-refrigerant residue, separately removing the separated condensed vapors and liquid-refrigerant residue, separating the refrigerant from its liquid residue, liquefying the refrigerant and recycling the liquefied refrigerant for such introduction in liquid phase into the mixture as aforesaid.

6. The apparatus of claim 3 including, an intermediate separator connected in the flow line connecting the lower outlet of the first separator to the second separator, a flow line connected to the upper outlet of the first separator and connected to an intermediate portion of the intermediate separator for flowing uncondensed vapors to the intermediate separator, a coil disposed in the lower portion of the first separator, a flow line connecting the inlet of the coil with a lower portion of the second separator, a flow line connecting the outlet of the coil with the flow line leading from the upper portion of the first separator to the intermediate portion of the second separator for circulating liquid-refrigerant residue from the second separator through the coil and into contact with the uncondensed vapors introduced into the intermediate separator, and an outlet at the upper end of the intermediate separator for removal of uncondensed vapors therefrom.

7. The apparatus of claim 3 including an intermediate separator connected in the flow line leading from the lower outlet of the first separator to the second separator, a flow line extending from the upper outlet of the first separator to an intermediate portion of the intermediate separator, a fractionating tower, a coil disposed in the lower portion of the fractionating tower, a flow line connecting the lower portion of the second separator to the inlet of the coil for flowing liquid residue to the coil for heating condensed liquids in the fractionating tower, a flow line connected from the outlet of the coil in the fractionating tower to the flow line leading from the upper portion of the first separator for contacting uncondensed vapors with liquid-refrigerant residue, and a flow line connected from the intermediate portion of the first separator to an upper portion of the fractionating tower for flowing the condensed vapors to the fractionating tower for fractionating the same.

8. The apparatus of claim 3 including a reflux tower, an inlet in the reflux tower for introducing the mixture therein, outlets adjacent the upper and lower portions of the reflux tower for separate removal of vaporized gases and condensed liquids, the flow line connected to the first separator for introducing the mixture therein extending from the upper outlet of the reflux tower so that the mixture first flows into the reflux tower and uncondensed vapors flow into the first separator, a coil in the reflux tower, a flow line leading from the lower portion of the second separator to the inlet of the coil, and a flow line leading from the outlet of the coil to the flow line extending from the upper outlet of the reflux tower to the first separator for contacting the vapors therein with liquid-refrigerant residue contained in the second separator.

References Cited in the file of this patent

UNITED STATES PATENTS

| | | |
|---|---|---|
| 2,214,678 | Raigorodsky | Sept. 10, 1940 |
| 2,242,173 | Buckley | May 13, 1941 |
| 2,295,809 | Schuftan | Sept. 15, 1942 |
| 2,318,512 | McHaffie | May 4, 1943 |
| 2,440,707 | Hoeven | May 4, 1948 |
| 2,522,640 | Ruhemann | Sept. 19, 1950 |
| 2,565,568 | McCants | Aug. 28, 1951 |
| 2,565,569 | McCants | Aug. 28, 1951 |
| 2,708,490 | Guinot | May 17, 1955 |